United States Patent

[11] 3,583,591

| [72] | Inventor | Kouichi Hayashida 651 Kayano Kohryo-machi, Kitakatsuragi-gun, Japan |
|---|---|---|
| [21] | Appl. No. | 830,659 |
| [22] | Filed | June 5, 1969 |
| [45] | Patented | June 8, 1971 |
| [32] | Priority | July 17, 1968 |
| [33] | | Japan |
| [31] | | 43/50455 |

[54] BOTTLE CAP
5 Claims, 9 Drawing Figs.

[52] U.S. Cl. .................................................. 315/40, 215/41
[51] Int. Cl. ........................................... B65d 41/22, B65d 23/00, B65d 53/00
[50] Field of Search ............................................ 215/40, 41

[56] References Cited
UNITED STATES PATENTS

| 3,254,785 | 6/1966 | Lovell | 215/41 |
| 3,325,033 | 6/1967 | Wheaton | 215/41X |
| 3,371,814 | 3/1968 | Ruprecht | 215/40 |

*Primary Examiner*—George T. Hall
*Attorney*—Oliver D. Olson

ABSTRACT: A bottle cap is made of flexible, synthetic resin such as polyethelene having a disc-shaped top wall and a short cylindrical sidewall, a circular flap being integrally formed on the inner surface of said cylindrical sidewall, said flap being tapered downwardly to have a free end, the diameter of which is smaller than that of the upper end. A metal layer is formed over the top disc and cylindrical side faces, and crimps on said metal layer produced in molding are embedded in said synthetic resin disc wall and cylindrical widewall. When the inside of the cylindrical wall engages the outside of the bottle mouth, said circular flap turns up on the top edge of the bottle mouth whereby such turned up portion sealingly fills the groove provided around the bottle mouth. The metal layer has a smooth surface and is bonded securely to the synthetic resin material.

PATENTED JUN 8 1971

KOUICHI HAYASHIDA
INVENTOR.

BY *Oliver D. Olson*
AGENT

KOUICHI HAYASHIDA
INVENTOR.

BY *Oliver D. Olson*

AGENT

BOTTLE CAP

BACKGROUND OF THE INVENTION

This invention relates to an improved bottle cap to be applied to a bottle having a circular groove around its neck portion.

This bottle is intended to contain various kinds of solids and liquids, such as refreshing drinks, medicines and seasonings. Conventionally, crown-type caps have been used to seal such bottles. Such caps require tools for their attachment to and detachment from bottles. Moreover, such caps frequently fail to maintain their seal when a nominal pressure differential develops between the inside and outside of the bottle.

SUMMARY OF THE INVENTION

In its basic concept, the bottle cap of this invention is constructed to have a disc-shaped top wall, a cylindrical sidewall and a circular flap, all of which are integrally formed of flexible synthetic resin, such as polyethylene. The top end of said circular flap is integrally formed to the inside of said cylindrical sidewall, and the flap is tapered downwardly to have a free end of less diameter than that of the upper end.

It is by virtue of the foregoing basic concept that the principle object of this invention is achieved; namely, to overcome the above enumerated disadvantages of prior bottle caps.

Another object of the present invention is to provide a bottle cap that retains its seal with a bottle even when the inside pressure of the bottle becomes larger than that of the outside atmosphere.

Another object is to provide a bottle cap that is able to bar any impurity from getting into the bottle when the inside pressure of such bottle becomes subatmospheric.

A further object is to provide a bottle cap which, when applied to the mouth of a bottle, a portion of said cap automatically engages the circular groove provided at the outside of bottle mouth, whereby no further manual or mechanical operation is needed for sealing the bottle.

Still another object is to provide a bottle cap coated with a metal layer having a smooth surface that is bonded securely to the synthetic resin material.

Other objects and advantages will be more apparent as the description proceeds with reference to the accompanying drawings of the preferred embodiments.

DESCRIPTION OF THE PREFERRED EMBODIMENTS

Figure 1:
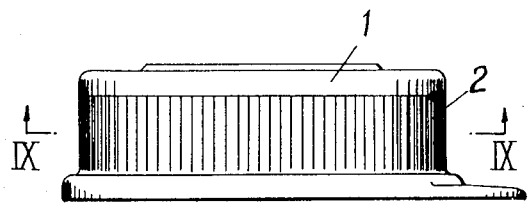
FIG. 1 is a side elevation view of a bottle cap according to the present invention.
Figure 2:
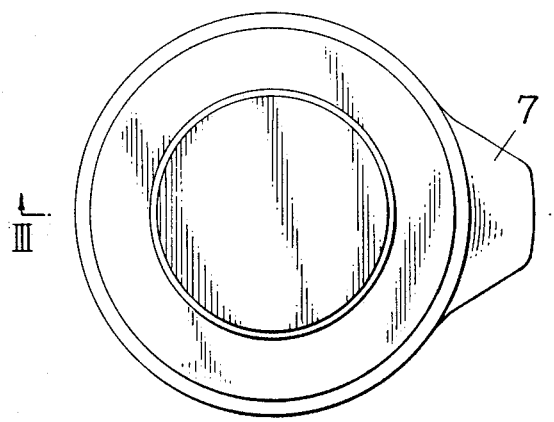
FIG. 2 is a plan view of the bottle cap.
Figure 3:
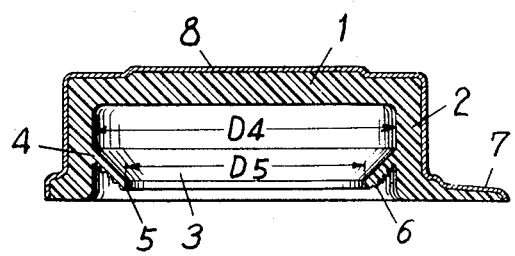
FIG. 3 is a cross section view taken on the line III–III of FIG. 2.

In the drawings, there is illustrated a one-piece bottle cap of the present invention comprising a disc-shaped top wall 1, a relatively short cylindrical sidewall 2 merging at its top end with the periphery of said top wall, and a circular flap 3 depending from approximately the midportion of the inner wall of said cylindrical sidewall. The flap is 14 convergent, so that the diameter D4 of its upper end 4 is greater than the diameter D5 of its lower free end 5. Annular ridges 6 are provided on the outside of said flap. 7 Is a tongue-shaped finger tab. 8 Is a metal layer. 9 Is the top end of a bottle mouth. 10 Is an annular groove provided at the outside of the bottle mouth. 11 Is a lower mold and 12 an upper mold to form a bottle cap of the present invention. 13 Is an aperture through which synthetic resin is forced into the mold. 14 Is a metal sheet. 15 Is a crimp of metal sheet produced when it is deformed into a bottle cap in the injection mold.

Figure 9:
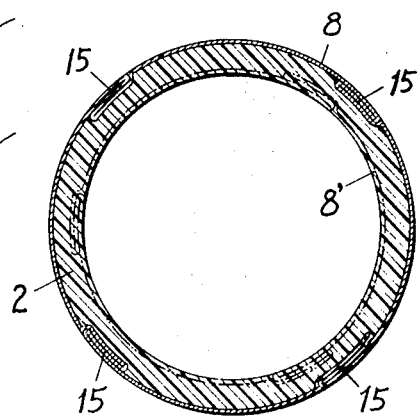
FIG. 9 is a cross section taken on the line IX–IX of FIG. 1.
Figure 7:
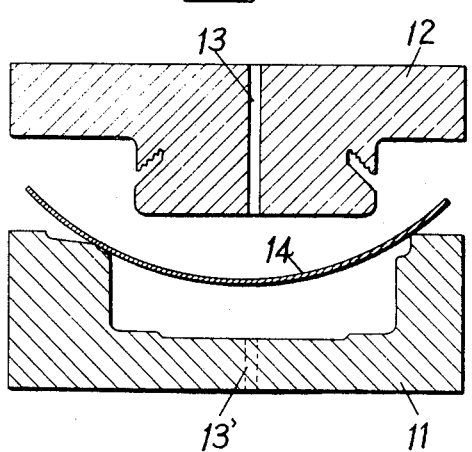
FIG. 7 and FIG. 8 are cross sections of upper and lower plastic mold sections, FIG. 7 showing the sections in open condition and FIG. 8 showing then in closed condition, preparatory to the injection of synthetic plastic resin.
Figure 8:
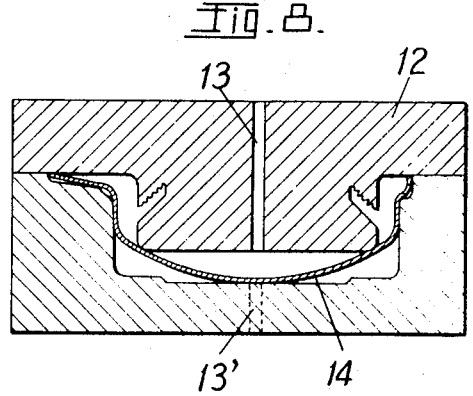

The metal sheet 14 is placed in the mold 11, as seen in FIG. 7. Then the upper mold 12 is inserted into the lower mold to form a bottle cap as seen in FIG. 8, after which molten synthetic resin is forced into the aperture 13 whereby said metal sheet 14 is pressed firmly onto the innerwall of the mold 11. The metal sheet 14 is made of tin foil, aluminum foil, or other metal of similar thinness, and is so thin that a number of crimps are produced under the heavy pressure of synthetic resin at the time of molding. However, such crimps will not appear on the metal surface, as seen in FIG. 9, as they are completely embedded in the cylindrical wall 2. Accordingly, the metal sheet 14 forming the metal layer 8 is firmly bonded onto cylindrical wall 2.

As described above, since the molten synthetic resin is poured through the aperture 13 on the metal sheet 14 laid previously in the mold, the metal sheet forms the outer surface of the bottle cap when it is taken out of the mold.

On the other hand, if an aperture 13' is provided in the lower mold 11, as shown in broken lines in FIG. 9, and then molten synthetic resin is forced thereinto, it is apparent that a metal layer 8' will form the inner surface of the bottle cap. In this instance, the metal sheet 14 is dimensioned to have a relatively smaller diameter so that its peripheral rim portion will not cover the annular recess for forming the flap 3 of the bottle cap, whereby the molten resin is allowed to enter said annular recess.

With the above, the construction of the bottle cap of the present invention is fully explained.

The following is a description of the use of this bottle cap.

Conventionally the crown cap made of metal sheet uses an annular groove 10 on the outside of the bottle mouth. The bottle cap of this invention is also intended for use with bottles having such groove 10.

Figure 4:
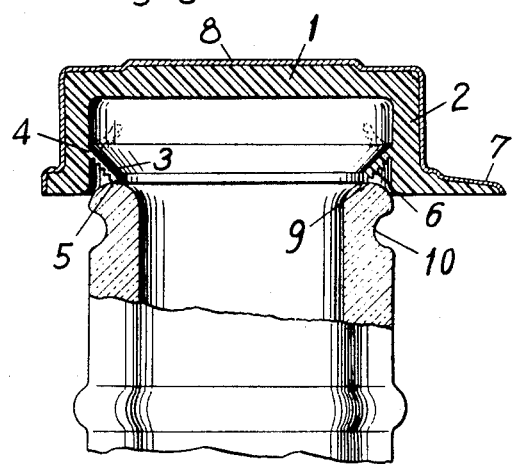
FIG. 4 is a cross section view showing the bottle cap ready for application to a bottle to be sealed.
Figure 5:
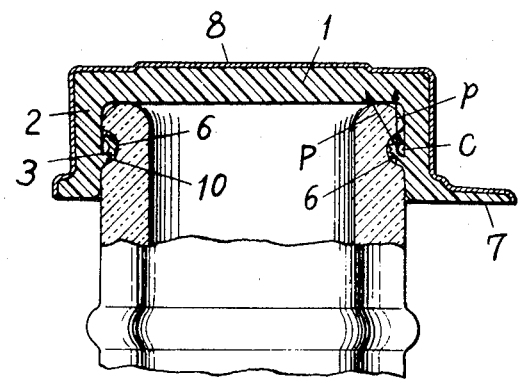
FIG. 5 is a cross section view showing the bottle cap applied in sealing engagement to the bottle mouth.

As shown in FIG. 4, the bottle cap is placed on the top edge 9 of the bottle mouth and under this status, the cap is pushed down. Then its flap 3, being convergent in a downward direction, turns upward so as to take a shape as shown in phantom line in FIG. 4. The cap is further pressed and the flap thus turned is forced into the groove 10, as seen in FIG. 5, wherein at the same time a tension is produced tending to return said flap to its original shape, whereby it becomes enclosed in the groove.

In addition, due to a force $p$, a component of said tension force P, reacting in a vertical direction, pressure between the top edge 9 and disc top wall 1 is further increased, thereby ensuring complete sealing.

Accordingly, even when pressure in the bottle increases because of an abrupt change in ambient temperature, the contents therein will be restrained from being forced out. Also if the pressure in the bottle leaks from the region between the top end 9 of the bottle mouth and top wall 1 into the space C between the circular flap 3 and cylindrical wall 2, as shown in FIG. 5, such pressure leak will be restrained since the pressure remaining in the space C acts in the same direction as tension P toward the circular flap 3, so that sealing engagement is increased still further.

Now that the flap 3 has turned up, its ridges 6 become enclosed in the groove 10 of the bottle, thereby still further improving the sealing effect.

Figure 6:
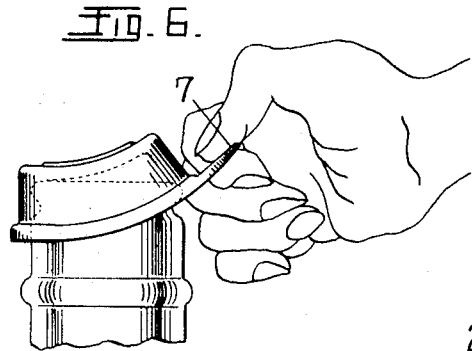
FIG. 6 is a side view showing the bottle cap about to be removed from the bottle mouth.

When the bottle cap is to be removed from the bottle mouth, any conventional cap opener may be used. However, since the tongue shaped tab 7 is provided at the lower edge of the cylindrical sidewall 2, such an opener is no longer needed, because the cap may be easily removed by thumbing the tap as shown in FIG. 6.

It will be understood that by this invention there is furnished an improved bottle cap wherein a metal layer 8 is bonded securely to either the outer face or inner face of the cap. Further, since any crimp 15 produced in the metal sheet is totally embedded in the synthetic resin, it has in an aesthetic sense a glossy color simulating that of a metal crown.

It will be apparent that various changes may be made in the size, shape, number and arrangement of parts described hereinbefore without departing from the spirit of this invention.

Having now described my invention and the manner in which it may be used, I claim:

1. A bottle cap for sealing a bottle having an annular grove adjacent its open end, the bottle cap being integrally molded of flexible synthetic resin and comprising a top wall, a cylindrical side wall and a circular imperforate sealing flap depending in a taper from the inside of said cylindrical sidewall so that the diameter of the upper end of said circular flap is larger than that of its lower free end, the flap being positioned on the sidewall so as to flex upward and seat resiliently in the annular groove of a bottle when pressed downward over the open end of the bottle.

2. The bottle cap of claim 1, wherein said circular flap is provided with annular ridges on its outer surface.

3. The bottle cap of claim 1, wherein a tongue-shaped tap is provided at a portion of the lower edge of said cylindrical sidewall.

4. The bottle cap of claim 1 wherein a metal sheet is bonded to the outer face of said top wall and cylindrical sidewall so that crimps produced on said sheet metal in molding are embedded in the resin.

5. The bottle cap of claim 1 wherein a metal sheet is bonded to the inner face of said top wall and cylindrical sidewall so that crimps produced on said metal sheet in molding are embedded in the resin.